United States Patent [19]

Modone

[11] Patent Number: 4,557,914

[45] Date of Patent: Dec. 10, 1985

[54] PROCESS FOR PRODUCING SUBSTANCES OPTICALLY TRANSPARENT TO INFRARED RAYS

[75] Inventor: Eros Modone, Turin, Italy

[73] Assignee: CSELT - Centro Studi e Laboratori Telecomunicazioni S.p.A., Turin, Italy

[21] Appl. No.: 626,053

[22] Filed: Jun. 29, 1984

[30] Foreign Application Priority Data

Jun. 30, 1983 [IT] Italy ................................. 67715 A/83

[51] Int. Cl.$^4$ ...................... C01B 19/04; C01B 17/00; C01B 25/14
[52] U.S. Cl. .................................. 423/303; 423/344; 423/509; 423/561 R; 423/561 A; 313/110; 427/255.2; 501/904
[58] Field of Search ................ 423/561 R, 561 B, 509, 423/344, 303; 252/301.6 S; 427/255.2; 501/904; 313/110

[56] References Cited

U.S. PATENT DOCUMENTS

| 2,671,739 | 3/1954 | Lander | 427/255.2 |
| 3,218,204 | 12/1965 | Ruehrwein | 427/255.2 |
| 3,224,912 | 12/1965 | Ruehrwein | 427/255.2 |
| 3,224,913 | 12/1965 | Ruehrwein | 427/255.2 |
| 3,664,866 | 5/1972 | Manaseuit | 427/255.2 |
| 4,066,481 | 1/1978 | Manaseuit et al. | 423/509 |
| 4,447,469 | 5/1984 | Peters | 427/255.2 |

Primary Examiner—Gary P. Straub
Attorney, Agent, or Firm—Karl F. Ross; Herbert Dubno

[57] ABSTRACT

In order to obtain substances that are optically transparent in the infrared range, usable in the manufacture of optical fibers or radiation emitters, a metal or metalloid chalcogenide other than an oxide is produced by a double-substitution reaction between a starting chalcogen compound—particularly a hydride such as $H_2S$, $H_2Se$ or $H_2Te$—and a salt of the desired metal or metalloid, e.g. a chloride. The starting compound and the reactant salt preferably are vaporized at a temperature below the melting point of the resulting metal chalcogenide which thereupon precipitates in the reaction chamber.

4 Claims, 1 Drawing Figure

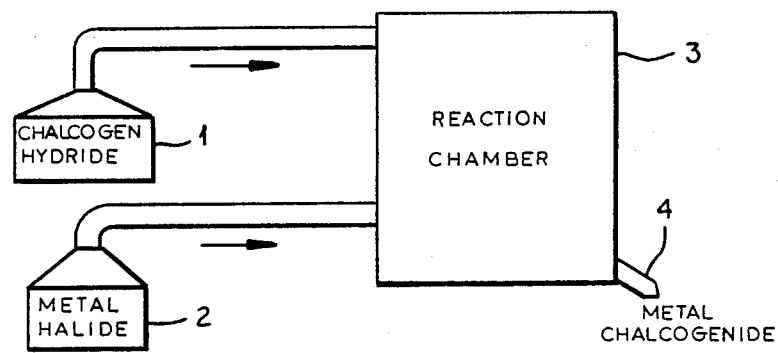

PROCESS FOR PRODUCING SUBSTANCES OPTICALLY TRANSPARENT TO INFRARED RAYS

FIELD OF THE INVENTION

My present invention relates to the production of substances that are optically transparent to infrared radiation and are usable in the manufacture of optical fibers or lasers and other radiation emitters.

BACKGROUND OF THE INVENTION

In the production of silicon-based fibers and other electronic components it is convenient to use the well-known chemical-vapor-deposition (CVD) process; see, for example, commonly owned U.S. Pat. Nos. 4,389,230 and 4,414,164. Thus, silicon can be obtained from one of the following reactions performed in a high-temperature furnace:

$$SiHCl_3 + H_2 \rightarrow Si + 3HCl \tag{1}$$

$$SiCl_4 + 2H_2 \rightarrow Si + 4HCl \tag{2}$$

Its oxide, i.e. silica, is available from the reaction $$SiCl_4 + O_2 \rightarrow SiO_2 + 2Cl_2 \tag{3}$$

Zinc sulfide and zinc selenide, usable in fiber-optical technology for infrared transmissivity, are available in accordance with reactions $$Zn + H_2S \rightarrow ZnS + H_2 \tag{4}$$

$$Zn + H_2Se \rightarrow ZnSe + H_2 \tag{5}$$

The CVD process is designed to minimize the problems of radiation absorption, e.g. intrinsically by substrate/impurity bonds and extrinsically through scattering by the presence of anomalous domains. These latter may result from grain dislocations in a crystalline substrate or, with a vitreous substrate, from crystalline zones or from separation of phases of different densities.

However, the aforedescribed redox reactions used in conventional CVD processes are sometimes accompanied by side reactions, involving different valence states, that give rise to undesired and often detrimental products. Reaction (4), for instance, may result in the formation of ZnH groups in the ZnS matrix, with the zinc in its monovalent form. These groups present absorption bands within the infrared range of interest lying between 2 and $12\mu$.

OBJECT OF THE INVENTION

The object of my present invention, therefore, is to provide a modified CVD process which obviates the redox reactions yielding undesired compounds.

SUMMARY OF THE INVENTION

In accordance with my present invention, the modified CVD process comprises vaporizing one or more chalcogen compounds and of one or more salts of a metal or metalloid, preferably a halide, and subjecting the resulting vapors under nonreducing and nonoxidizing conditions to a double-substitution reaction producing a chalcogenide (other than an oxide) of the metal or metalloid referred to.

Chalcogens, as is well known in the art, are members of the oxygen family in Group VIA of the Periodic Table, namely—besides oxygen—sulfur, selenium tellurium and polonium. I particularly contemplate the use of sulfur, selenium and tellurium for the practice of my present process in which I prefer their hydrides as a starting compound, i.e. $H_2S$, $H_2Se$ or $H_2Te$. The salt serving as a reactant is preferably a chloride of the metal or metalloid whose sulfide, selenide or telluride is to be produced.

The double-substitution reaction, avoiding changes in the state of oxidation of any participating reactant, eliminates the aforedescribed side reactions based on different valence states. It is particularly advantageous when the resulting chalcogenide is a high-boiling compound which during processing assumes a state of aggregation different from that of both the initial and residual reactants and byproducts, thereby facilitating the separation of the desired product. When the desired product is solid at the processing temperature, which ought to be much higher than the boiling point of the reactants, the process requires low energy and, with equilibrium shifting entirely toward the right-hand side of the reaction, operates with an efficiency close to 100%.

The metals and metalloids primarily usable in my process are arsenic, antimony, zinc, germanium, tin, lead, silicon and cadmium. The resulting chalcogenides, especially sulfides, have a wide transmission window in the infrared range, with low absorption coefficients and a theoretical attenuation of about $10^{-2}$ dB/Km at 5–6$\mu$. Their thermal-expansion coefficient is $10^{-6}$/K which facilitates the drawing of optical fibers from glasses containing same. Their refractive indices of about 2 makes them suitable for the manufacture of glass/plastic fibers with a stepped index of refraction.

BRIEF DESCRIPTION OF THE DRAWING

The above and other features of my invention will now be described in detail with reference to the accompanying drawing the sole FIGURE of which diagrammatically shows an installation for performing a modified CVD process as described above.

SPECIFIC DESCRIPTION

As shown in the drawing, two boiling vessels 1 and 2 respectively generate vapors of a chalcogen hydride and a metal halide. These vapors are concurrently led to a reaction chamber 3 heated to a start-up temperature which causes them to interact, in a nonoxidizing and nonreducing atmosphere, to produce a desired metal chalcogenide whose melting point lies well above the chamber temperature and which therefore precipitates as a solid at an outlet 4. The metal, of course, could be replaced by a metalloid such as arsenic or silicon.

EXAMPLE

Arsenic trisulfide is produced by a double-substitution reaction given by $$3H_2S + 2AsCl_3 \rightarrow As_2S_3 + 6HCl \tag{6}$$

The hydrogen sulfide (or sulfur hydride) and the arsenic trichloride, respectively vaporized in vessels 1 and 2, have boiling points of about $-60°$ C. and $+63°$ C., respectively; chamber 3, to which their vapors are separately fed, is initially heated to about 200° C. to start up the reaction which is exothermic, generating a fusion temperature of around 300° C. This is still below the melting point of the arsenic trisulfide recovered as a precipitate at outlet 4. Reaction can be performed under atmospheric pressure.

Similar processes involve the reaction of $H_2S$ with $GeCl_4$, $SnCl_4$, $PCl_3$ and $SiCl_4$ for the production of high-boiling chalcogenides $GeS_2$, $SnS_2$, $P_2S_3$ and $SiS_2$. Higher temperatures are required for reactions between $H_2S$ and $SbCl_3$, $ZnCl_2$, $SnCl_2$ and $CdCl_2$ to produce $Sb_2S_3$, $ZnS$, $SnS$ and $CdS$, respectively.

Mixtures of different solid chalcogenides can be obtained, as starting materials for glasses of predetermined composition, from combinations of metal or metalloid sulfides, selenides and tellurides treated in the manner described.

I claim:

1. In the production of shaped glass articles transparent to infrared radiation from chalcogenides, the improvement which consists of the process of forming said chalcogenides by the steps of:
    (a) vaporizing in a first vessel at least one chalcogen hydride selected from the group which consists of dihydrogen sulfide, dihydrogen selenide and dihydrogen telluride to produce a chalcogen hydride vapor;
    (b) vaporizing in a second vessel at least one chloride salt of a metal or metalloid selected from the group which consists of As, Sb, Zn, Ge, Sn, P, Si and Cd to produce a vapor thereof;
    (c) separately feeding the vapors produced in steps (a) and (b) to a reaction chamber containing only said vapors and preheated to a temperature below the melting point of said chalcogenides but sufficient to induce reaction of said vapors in said chamber to produce said chalcogenides;
    (d) effectuating said reaction in said chamber by double substitution under nonreducing and nonoxidizing conditions at a temperature below the melting point of said composition, thereby precipitating the chalcogenides as a solid from the reaction in said chamber; and
    (e) discharging the precipitated chalcogenides in solid form from an outlet of said chamber.

2. The process defined in claim 1 wherein said chalcogen hydride is dihydrogen sulfide and said chloride is a chloride of an element selected from the group of As, Ge, Sn, P and Si.

3. The process defined in claim 2 wherein said chloride is $AsCl_3$, $GeCl_4$, $SnCl_4$, $PCl_3$ or $SiCl_4$.

4. The process in claim 2 wherein said chalcogen hydride is dihydrogen sulfide and said chloride is selected from the group which consists of $SbCl_3$, $ZnCl_2$, $SnCl_2$ and $CdCl_2$.

* * * * *